(12) United States Patent
Pukari

(10) Patent No.: US 9,406,178 B2
(45) Date of Patent: Aug. 2, 2016

(54) ELECTROMECHANICAL LOCK

(71) Applicant: iLOQ Oy, Oulu (FI)

(72) Inventor: Mika Pukari, Oulu (FI)

(73) Assignee: ILOQ OY, Oulu (FI)

( * ) Notice: Subject to any disclaimer, the term of this patent is extended or adjusted under 35 U.S.C. 154(b) by 113 days.

(21) Appl. No.: 14/357,392

(22) PCT Filed: Nov. 6, 2012

(86) PCT No.: PCT/EP2012/071928
§ 371 (c)(1),
(2) Date: May 9, 2014

(87) PCT Pub. No.: WO2013/068344
PCT Pub. Date: May 16, 2013

(65) Prior Publication Data
US 2015/0332527 A1    Nov. 19, 2015

(30) Foreign Application Priority Data
Nov. 11, 2011   (EP) ..................................... 11188746

(51) Int. Cl.
*G07C 9/00* (2006.01)
*H04L 29/06* (2006.01)

(52) U.S. Cl.
CPC ........ *G07C 9/00007* (2013.01); *G07C 9/00119* (2013.01); *G07C 9/00174* (2013.01); *G07C 9/00309* (2013.01); *H04L 63/08* (2013.01); *G07C 2009/00317* (2013.01); *G07C 2009/00634* (2013.01); *G07C 2009/00769* (2013.01); *Y10T 70/7062* (2015.04)

(58) Field of Classification Search
CPC ........... G07C 9/00007; G07C 9/00309; G07C 2209/08; G07C 2009/00634; H04L 63/08
See application file for complete search history.

(56) References Cited

U.S. PATENT DOCUMENTS

| | | | |
|---|---|---|---|
| 2002/0024420 A1* | 2/2002 | Ayala | ..................... E05B 5/003 340/5.61 |
| 2008/0246587 A1 | 10/2008 | Fisher | |
| 2010/0073129 A1 | 3/2010 | Pukari | |
| 2010/0231350 A1* | 9/2010 | Scharer | ............... E05B 47/0012 340/5.2 |
| 2012/0270496 A1* | 10/2012 | Kuenzi | ............... G07C 9/00309 455/41.1 |

FOREIGN PATENT DOCUMENTS

| | | |
|---|---|---|
| CN | 101354799 A | 1/2009 |
| CN | 101685556 A | 3/2010 |
| DE | 10 2010 019 467 A1 | 11/2011 |
| EP | 2 157 552 A1 | 2/2010 |
| WO | WO 2010/125306 A2 | 11/2010 |

* cited by examiner

*Primary Examiner* — Nabil Syed
(74) *Attorney, Agent, or Firm* — Birch, Stewart, Kolasch & Birch, LLP

(57) ABSTRACT

An electromechanical lock is provided. The lock comprises an electronic circuitry means for providing a wireless interface for a communication device to proceed authentication with the communication device, and issue an open command provided that the authentication is successful; actuator means to receive the open command to set the lock in a mechanically openable state, the electronic circuitry means being configured to receive wirelessly from the communication device operating power for the electronic circuitry means and the actuator means.

20 Claims, 5 Drawing Sheets

ELECTROMECHANICAL LOCK

FIELD

The invention relates to electromechanical locks and especially NFC-powered electromechanical locks.

PRIOR ART

Various types of electromechanical locking systems are replacing traditional mechanical locking systems and wired access control systems. Wireless electromechanical locks require an external supply of electric power, a battery inside the lock, a battery inside the key, or means for generating electric power within the lock making the lock user-powered. Electromechanical locking systems provide many benefits over traditional mechanical locking systems. They provide better security and flexible access management of keys, security tokens and locks. A wireless electromechanical locking system provides an easy-install and cost effective solution compared to a wired access control system.

In addition, most electromechanical locks and/or keys and tokens are programmable. It is possible to program the lock to accept different keys and decline others.

Typical electromechanical locks require an external supply of electric power, a battery inside the lock, a battery inside the key, or means for generating electric power within the lock making the lock user-powered. Further refinement is needed for making the electromechanical locks to consume as little electric power as possible.

BRIEF DESCRIPTION

According to an aspect of the present invention, there is provided an electromechanical lock comprising: an electronic circuitry means for providing a wireless interface for a communication device to proceed authentication with the communication device, and issue an open command provided that the authentication is successful; actuator means to receive the open command to set the lock in a mechanically openable state, the electronic circuitry means being configured to receive wirelessly from the communication device operating power for the electronic circuitry means and the actuator means.

According to another aspect of the present invention, there is provided a method for operating an electromechanical lock, comprising: receiving wirelessly from the communication device operating power for providing a wireless interface for a communication device; proceeding authentication with the communication device using the wireless interface, issuing an open command provided that the authentication is successful; and setting the lock in a mechanically openable state in response to the open command.

According to another aspect of the present invention, there is provided a computer program product encoding a computer program of instructions for executing a computer process carrying out the steps of: controlling the storing of operating power received wirelessly from the communication device, and applying the received operating power for providing a wireless interface for a communication device; proceeding authentication with the communication device using the wireless interface, and provided that the authentication is successful, issuing an open command for setting the lock in a mechanically openable state.

LIST OF DRAWINGS

Embodiments of the present invention are described below, by way of example only, with reference to the accompanying drawings, in which FIG. 1A illustrates an embodiment of an electronic authentication system;

DESCRIPTION OF THE INVENTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1A:
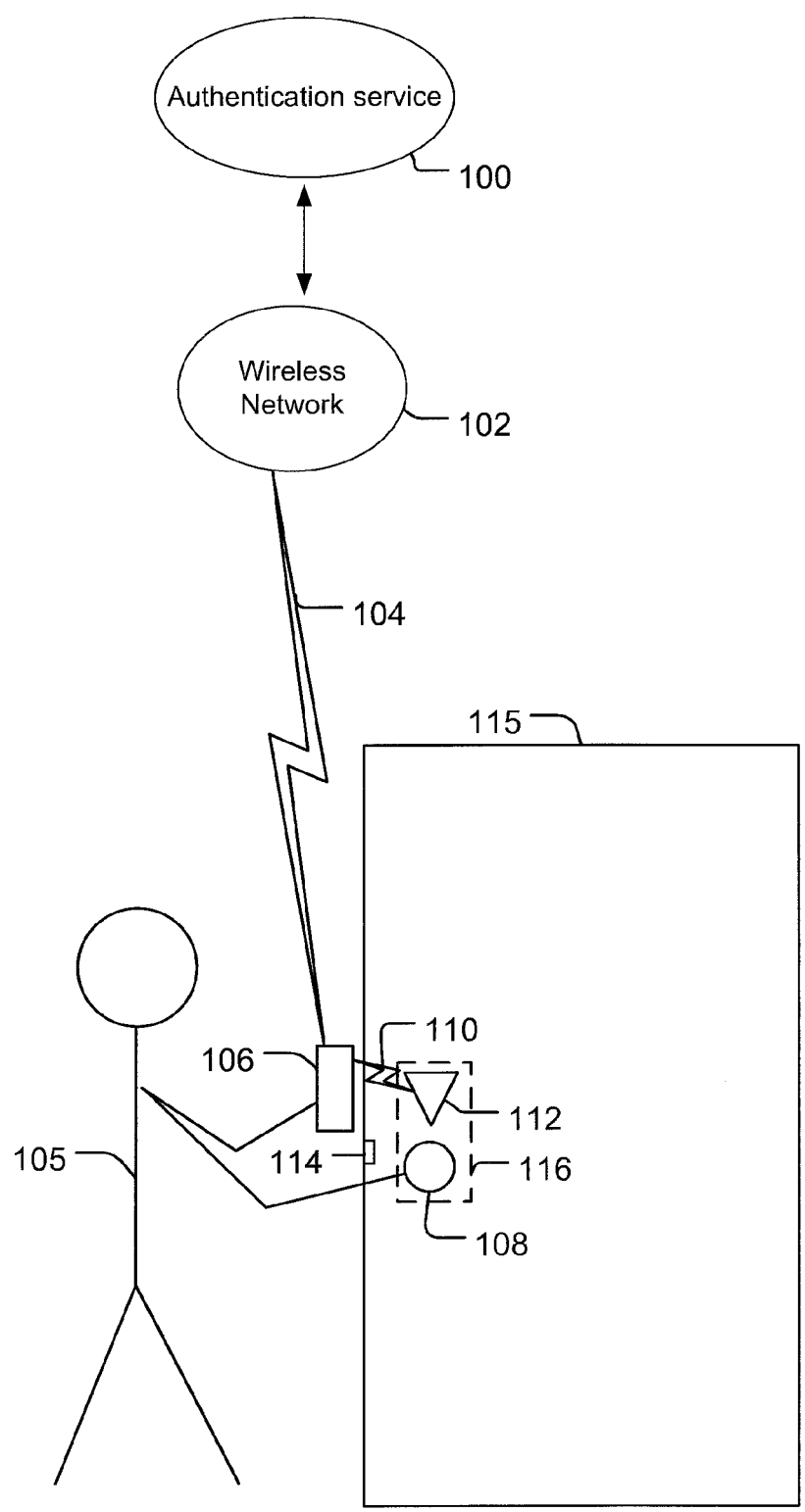
FIG. 1B illustrates an embodiment of a NFC-powered electronic locking system.

In an embodiment of the invention, an electronic key is utilized for wirelessly opening an electromechanical wireless and batteryless lock. The key may be carried by a person as a part of his wireless communication device. FIG. 1A shows an embodiment of an electronic locking system. A user 105 is about to open a door 115. The user has a communication device 106.

The communication device 106 refers to a portable computing device. Such computing devices include wireless mobile communication devices such as a mobile phone, a smartphone, a tablet computer, a personal digital assistant (PDA) or a personal computer. The communication device 106 may have a wireless network channel 104 connection to a wireless network 102. The wireless connection channel 104 and the wireless network 102 may be implemented according to the GSM (Global System for Mobile Communications), WCDMA (Wideband Code Division Multiple Access), WLAN (Wireless Local Area Network) or any other suitable standard/non-standard wireless communication means.

In an embodiment, the communication device is equipped with a SIM/UICC card. SIM (Subscriber Identity Module) and UICC (Universal Integrated Circuit Card) are smart cards used in mobile terminals in GSM and UMTS networks. The smart cards comprise a processor, I/O circuits and a memory, typically a few hundred kilobytes or larger. The memory and the smart card may be utilised for example in to ensure the integrity and security of all kinds of personal data. The memory may store applications and storage space for data.

The communication device 106 is equipped with a short-range wireless communication unit configured to communicate with other respective short-range units upon detecting such a unit.

In an embodiment, short-range wireless communication is realised with a Near Field Communication (NFC) technique. NFC is a set of short-range wireless technologies, typically requiring a distance of 4 cm or less. NFC operates at 13.56 MHz on ISO/IEC 18000-3 air interface and at rates ranging from 106 kbit/s to 424 kbit/s. NFC always involves an initiator and a target; the initiator actively generates a radio frequency (RF) field that can power a passive target. This enables NFC targets to take very simple form factors such as tags, stickers, key fobs, or cards that do not require batteries. Above, ISO stands for International Organization for Standardization and IEC for the International Electrotechnical Commission.

In a passive communication mode the initiator device provides a carrier fields and the target device answers by modulating the existing field. In this mode, the target device may draw its operating power from the initiator-provided electromagnetic field, thus making the target device a transponder. In an embodiment of the invention, the communication device 106 is acting as the initiator.

The door 115 comprises an electromechanical lock 116. The lock comprises a lock interface 108, a lock antenna 112 and locking mechanism 114. An example of the locking mechanism is a lock bolt. The lock interface may be a doorknob or handle, for example. The lock antenna 112 is connected to an electronic circuitry of the lock (not shown in FIG. 1A). The circuitry comprises a short-range communication device. The device may be an NFC transceiver. In an embodiment, the NFC transceiver of the lock is the target device.

When the user 105 approaches the door he wishes to open, he brings the communication device 106 close to the lock antenna 112. The electronic circuitry of the lock is powered by the short-range transmission 110 of the communication device and a transaction is initiated. In an authentication procedure the communication device reads an authentication challenge from the electronic circuitry of the lock. The communication device 106 computes a response and transmits the response to the electronic circuitry of the lock. Next, the lock performs the authentication. In the authentication, the lock authenticates the response. In an embodiment, the response is authenticated against the challenge. If the authentication succeeds the lock is set to an openable state. All operations above are performed using the power received from the short-range transmission of the communication device.

The above described challenge-response authentication method is just an example of the authentication procedure; also other authentication procedures can be used. In general, the authentication tasks may be divided between the lock and the communication device symmetrically or asymmetrically. When the communication device is brought in wireless contact with the lock, the lock and the device proceed with the authentication procedure. For example, the lock may authenticate the communication device, the communication device may authenticate the lock or the both parties authenticate each other.

Next, the user operates the user interface 108 of the lock. The operating may comprise turning a doorknob or handle. The operation activates the lock and provides operating power for the lock to operate the lock mechanism.

In an embodiment, the communication device 106 performs authentication procedure using an authentication service 100 over the wireless network channel 104.

In an embodiment, the authentication service may record an audit trail of actions related to the locks of the lock systems. Thus, each attempt to open a lock may be viewed later. In addition, the authentication service may utilize a time-limited access rights management. In an embodiment, the lock may store each action in an audit trail. The authentication service may be realized with one or more computers, servers or computing equipment and associated software.

In an embodiment, the authentication procedure can also be performed locally on the mobile communication devices SIM/UICC card without a server using the SIM/UICC card related authentication technique.

Any suitable authentication technique may be used in connection with the embodiments of the present invention. The selection of the authentication technique depends on the desired security level of the lock 106 and availability of wireless network connections on the lock site.

In an embodiment, a challenge-response authentication is utilized. It is briefly described here as an example. A challenge may comprise a lock system id, a lock id, access data and a check value. The lock system id identifies the lock system to which the lock belongs. The lock id identifies the lock in the lock system. Each lock in a lock system may comprise a unique identification. The access data may be random numeric data. The check value is a cyclic redundancy check value confirming the integrity of the challenge.

In an embodiment, the authentication service or the communication device calculating the response may determine on the basis of the response whether the authentication will succeed or not. The communication device 106 may inform the user whether the authentication will succeed or not.

In an embodiment, a Personal Identification Number (PIN) or finger print data of the user of the communication device may be used when generating a response for the challenge. The communication device may comprise a finger print data reader configured to read a finger print and generate a numeric presentation on the basis of the finger print.

The challenge may comprise a PIN or finger print query. The user of the communication device may type in the PIN or use the finger print data reader of the communication device. The communication device is configured to send the PIN or the numeric presentation of the finger print as a response to the challenge. The lock may be configured to store a set of PINs and finger prints which allow the opening of the lock. The electronic circuitry of the lock compares the response to the stored values and if a match is found, the authentication is deemed to be successful.

Figure 1B:
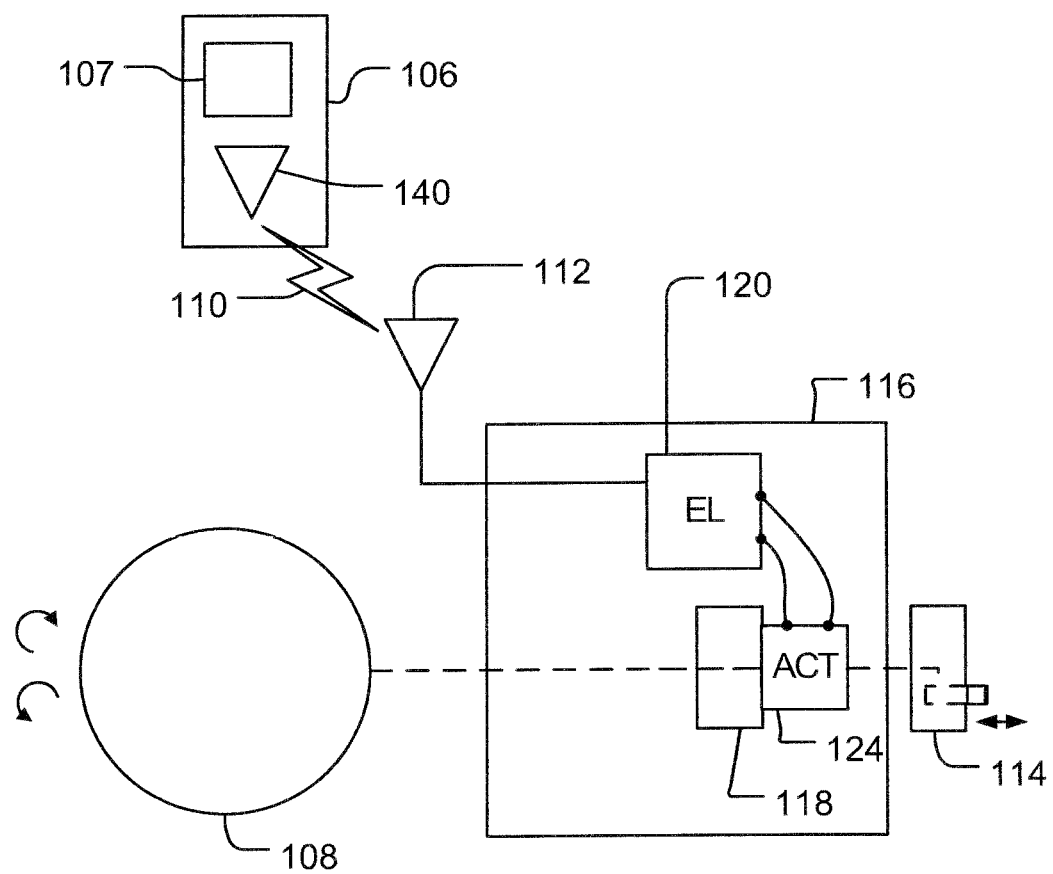

FIG. 1B shows a more detailed example of an electromechanical lock 116 and a communication device 106. The communication device comprises a short-range communication unit 140. In an embodiment, the short-range communication unit 140 is an NFC transceiver of the active type acting as the initiator. The communication device 106 may comprise a wireless transceiver 107 for realising a wireless network channel connection to a wireless network, such as a GSM network, a WCDMA network or a WLAN network or any other suitable standard/non-standard wireless communication network.

The lock 116 comprises an electronic circuitry 120 and a lock antenna 112, a lock interface 108 and a locking mechanism 114 as previously described. The electronic circuitry 120 may be implemented as one or more integrated circuits, such as application-specific integrated circuits ASIC. Other embodiments are also feasible, such as a circuit built of separate logic components, or memory units and one or more processors with software. A hybrid of these different embodiments is also feasible. When selecting the method of implementation, a person skilled in the art will consider the requirements set on the power consumption of the device, production costs, and production volumes, for example. The electronic circuitry 120 may be configured to execute computer program instructions for executing computer processes. The lock 116 further comprises an electrically operated actuator 124 which may set the locking mechanism 114 to openable or closed state. Furthermore, the lock may comprise means 118 configured to control the actuator mechanically to return to locked state.

Figure 2:
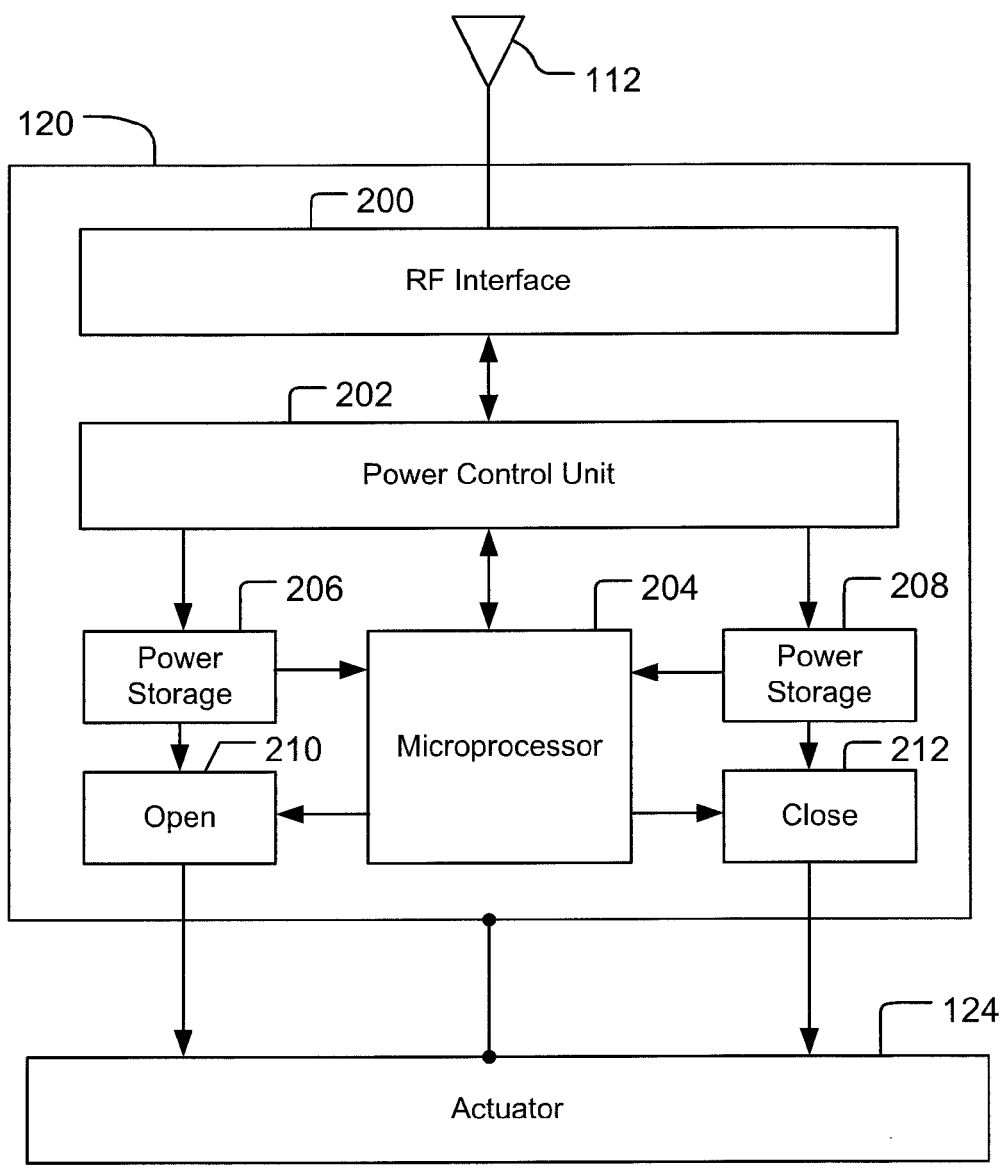
FIG. 2 illustrates an embodiment of an electronic circuitry of a lock.
Figure 3A:
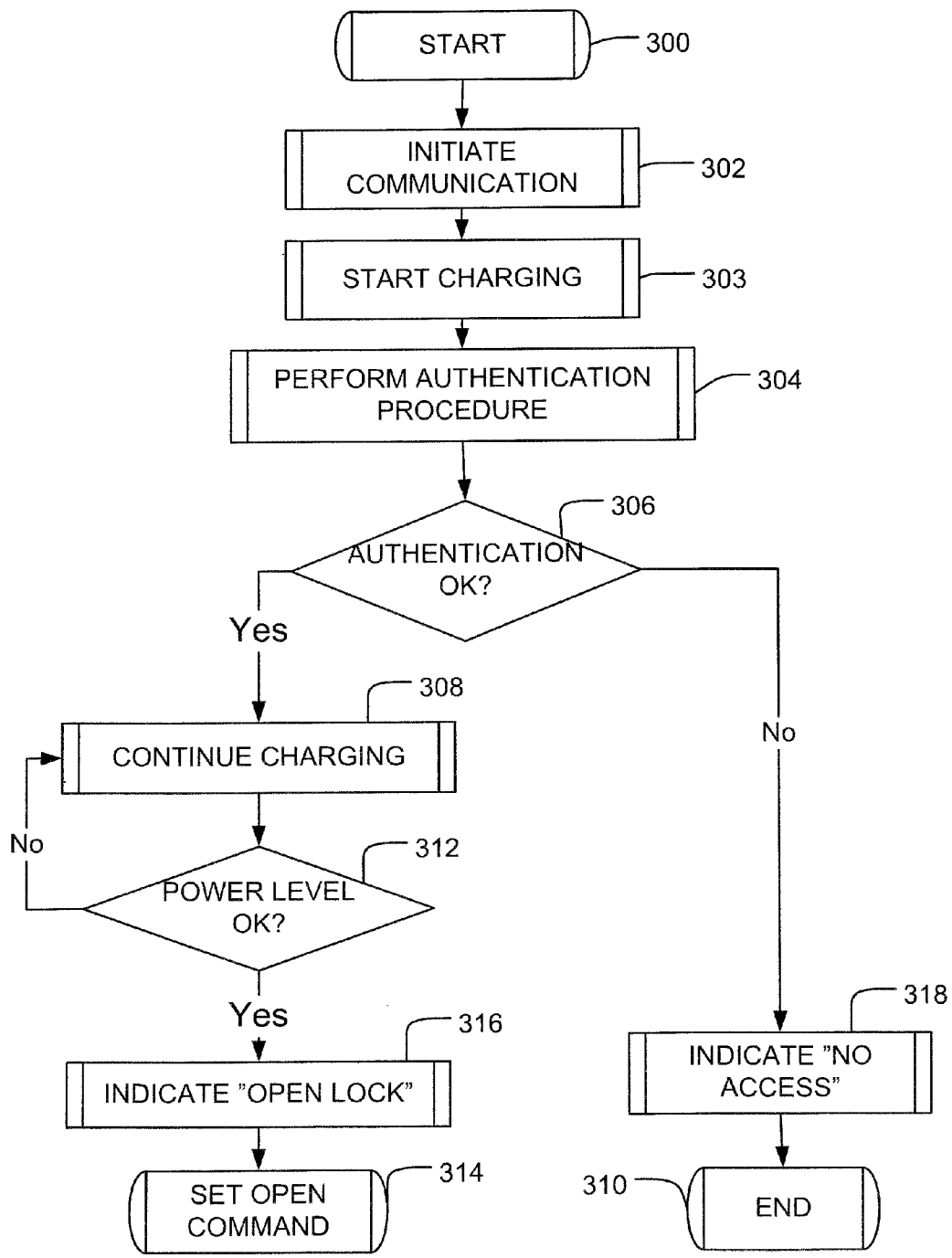
FIGS. 3A and 3B are flowcharts illustrating embodiments.
Figure 3B:
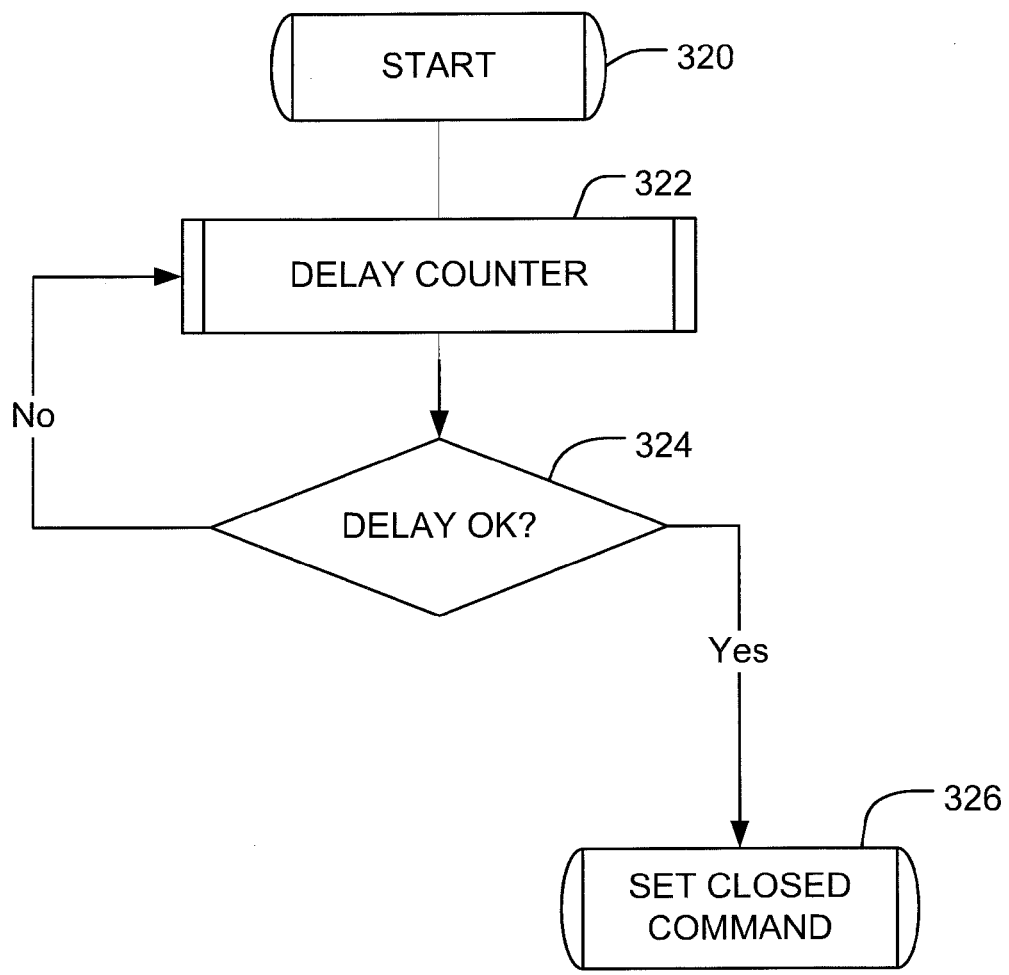

FIG. 2 illustrates the electronic circuitry 120 of the lock. Let us study the circuit and the opening operation in more detail. Also flowcharts of FIGS. 3A and 3B illustrate the opening operations.

The lock electronics circuit 120 is realized with an RF interface 200, a power control unit 202, a processing unit or a microcontroller 204, power storages 206, 208 and an open 210 and close 212 analog switches. The microprocessor 204 controls the operation of the circuit 120.

The RF interface 200 is configured to provide a wireless interface between the lock and a communication device. The circuit is configured to receive wirelessly 110 from the communication device operating power for all operations. The microprocessor 204 measures and manages the charging of the power storages by keeping RF interface 200 active between the communication device until sufficient charging level is reached. In an embodiment, the RF interface is an NFC transceiver.

The processing unit 204 may be a microcontroller, a processor or a circuitry comprising a memory for storing a computer program of instructions.

The processing unit 204 is configured to process authentication procedure in connection with the communication device. After a successful authentication and when sufficient power level is reached the actuator 124 is configured to set the lock in a mechanically openable state. The control switch 210 is activated and energy of the power storage 206 is supplied to the actuator 124. After a predefined delay the actuator is reset to locked state by supplying electric power of the power storage 208 through the close switch 212 to the actuator 124. In an embodiment, the actuator 124 may comprise an electric motor which is driven to clockwise in case of openable state and counterclockwise when reset. When the actuator 124 has set the lock in a mechanically openable state, the locking mechanism 114 can be moved by operating the user interface 108, for example. Other suitable operating mechanisms may be used as well.

The power storages are configured to store electric power. They may be realized with capacitors or any other suitable technology known in the art. The number of power storages is not limited to two but it is a design feature. The open 210 and close 212 analog switches are configured to connect the operating power stored in the power storages 206, 208 to actuator 124.

The electronic circuitry 120 including the processing unit 204 is configured to operate on the power received wirelessly from the communication device (106). In addition, the circuitry is configured to receive and store operating power for the actuator means.

FIGS. 3A to 3B are flowcharts illustrating embodiments of the invention. Here it is assumed that by default the electromechanical lock 116 of the door 115 is in a locked state and it remains in the locked state until set to an openable state.

In this example we may assume that the lock antenna 112 may be embedded in the door knob 108.

The opening sequence starts is step 300 of FIG. 3A.

In step 302, the user of the communication device 106 initiates the communication device. This may comprise switching the NFC transceiver of the communication device on. The communication device is placed so that the lock antenna 112 is within the coverage area of the NFC transceiver of the communication device. For example, the user may touch the lock antenna with the communication device. This establishes a connection between the wireless interface 112 of the lock and the communication device. Likewise the charging of the power storages 206, 208 and the authentication operations are activated.

In step 303, the charging of power storages is started. The power storages are charged from the energy received wirelessly from the communication device.

In step 304, the authentication procedure is performed. As stated above, the authentication procedure may involve challenge-response but any other suitable authentication method may be used as well. The charging of the power storages may be on-going while authentication is performed.

In step 306 it is checked whether the authentication was successful or not. If not, the lock and/or the communication device may indicate in step 318 an unsuccessful authentication with a suitable indication such as a visual or audio indicator or both. In this case, the process ends in step 310.

If the authentication was successful, the charging of the power storages is continuing in step 308. The changing continues until the processing unit determines in step 312 that required power levels have been obtained. In step 316, the communication device 106 and/or the lock 116 may signal to user when the authentication has succeeded and the power storages are charged so that the communication device 106 can be removed from the knob 108. The signal may audio or visual effect or both. Examples of signals are a symbol in the communication device display or led-light in the lock 116, an audio signal given from the lock 116 and from the communication device 106. Different indicators may be given in access agreed and in access denied cases.

In step 314, the processing unit 204 issues an open command to the actuator means 124 to set the lock in a mechanically openable state. In an embodiment, this is realized by the processing unit giving a command to the switch 210 to connect the power stored in the storage 206 to the actuator 124.

Now turning the door knob 108 operates the lock mechanism and opens the lock.

FIG. 3B is another flowchart illustrating an embodiment. The embodiment starts in step 320 when the actuator has received an open command and the lock has been set in an openable state.

In step 322, the microprocessor 204 sets a delay counter with a predetermined delay.

In step 324, the processing unit 204 checks whether the predetermined delay has elapsed. If the delay has elapsed, the microprocessor 204 issues a close command to the actuator in step 326. In an embodiment, this is realized by the processing unit giving a command to the switch 212 to connect the power stored in the storage 208 to the actuator 124.

This closes the lock. The above method ensures that in case the knob 108 is not operated after setting the lock 116 to openable state, the lock 116 is locked after predefined time.

In an embodiment, the actuator 124 can be set mechanically to locked state when the knob 108 operation is finished. This may be realized by means 118 which are connected to the door knob and comprise a mechanical connection with the actuator. The means may be a mechanical construction connected to the axis connecting the door knob 108 to the locking mechanism 114 and comprise a semi-fixed connection to the actuator. For example, when the door knob counterclockwise returns to an initial position the means force the actuator to set the lock in a locked state. However, the means 118 allow the electrical control of the actuator performed by the processing unit 204 when the knob 108 is not operated.

As used in this application, the term 'circuitry' or "electronic circuitry" refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, features of the invention are realized as software. Embodiments may be realized as a computer program product encoding a computer program of instructions for executing a computer process carrying out the above described steps for operating an electromechanical lock.

It will be obvious to a person skilled in the art that the inventive concept can be implemented in various ways. The invention and its embodiments are not limited to the examples described above but may vary within the scope of the claims.

The invention claimed is:

1. An electromechanical lock comprising:
an electronic circuitry including a wireless interface for communicating with a communication device, the electronic circuitry being configured to:
proceed authentication with the communication device, and
receive wirelessly from the communication device operating power for the electronic circuitry for authentication;
perform authentication utilizing the received operating power;
and, provided that the authentication is unsuccessful, cease receiving operating power and end operation;
and, provided that the authentication is successful,
receive wirelessly from the communication device operating power until a required power level has been obtained for issuing an open and close command for an actuator,
issue the open command and in case a user input is not received in a predefined time, the close command;
the actuator being configured to receive the open command to set the lock in a mechanically openable state and the close command to set the lock in a mechanically locked state.

2. The electromechanical lock of claim 1, further comprising one or more storages for storing operating power for sending the open and close commands to the actuator and for the operating power required by the actuator.

3. The electromechanical lock of claim 1, further comprising storages for storing operating power for sending the open command and storages for storing operating power for sending the close command to the actuator.

4. The electromechanical lock of claim 1, further comprising
a user interface configured to receive input from a user, and
a coupling arrangement for coupling the user input to a lock mechanism in case the actuator is set to the openable state.

5. The electromechanical lock of claim 4, further comprising an arrangement for mechanically controlling the actuator to return the lock from the openable state to the locked state when the user input based opening operation is finished.

6. The electromechanical lock of claim 1, wherein the electronic circuitry is configured to indicate a user when the lock is openable and when access is denied.

7. The electromechanical lock of claim 1, wherein the electronic circuitry is configured to send the communication device an indication when the lock is openable and when access is denied.

8. A method for operating an electromechanical lock, comprising:
providing a wireless interface for communicating with a communication device;
receiving wirelessly from the communication device operating power for proceeding authentication with the communication device using the wireless interface, and,
provided that the authentication is unsuccessful, ceasing receiving operating power and ending operation, and
provided that the authentication is successful, receiving wirelessly from the communication device operating power until a required power level has been obtained for issuing an open and close command for an actuator,
issuing the open command and
issuing the close command in case a user input is not received after the open command in a predefined time;
setting the lock in a mechanically openable state in response to the open command and
setting the lock in a mechanically locked state in response to a close command.

9. The method of claim 8, further comprising: storing operating power in one or more storages for sending the open and close commands and for the operating power required by the actuator.

10. The method of claim 8, further comprising: controlling the lock mechanically to return from the openable state to the locked state when the user input based opening operation is finished.

11. The method of claim 8, further comprising: indicating a user when the lock is openable and when access is denied.

12. The method of claim 8, further comprising: sending the communication device an indication when the lock is openable and when access is denied.

13. A non-transitory computer program product encoding a computer program of instructions that, when executed on an electronic circuitry, including a wireless interface, of an electromechanical lock, carry out the steps of:
controlling reception of operating power received wirelessly from a communication device via the wireless interface, and applying the received operating power for proceeding authentication with the communication device using the wireless interface, and provided that the authentication is unsuccessful,
ceasing the reception of operating power and ending operation;
and provided that the authentication is successful,
controlling the reception of operating power received wirelessly from the communication device until a required power level has been obtained for issuing an open and close command, and applying the received operating power for issuing open command for setting the lock in a mechanically openable state and issuing close command in case a user input is not received after the open command in a predefined time.

14. The electromechanical lock of claim 2, further comprising
a user interface configured to receive input from a user, and
a coupling arrangement for coupling the user input to a lock mechanism in case the actuator is set the openable state.

15. The electromechanical lock of claim 3, further comprising
a user interface configured to receive input from a user, and
a coupling arrangement for coupling the user input to a lock mechanism in case the actuator is set the openable state.

16. The electromechanical lock of claim 14, further comprising an arrangement for mechanically controlling the actuator to return the lock from the openable state to the locked state when the user input based opening operation is finished.

17. The electromechanical lock of claim 15, further comprising an arrangement for mechanically controlling the actuator to return the lock from the openable state to the locked state when the user input based opening operation is finished.

18. The electromechanical lock of claim 2, wherein the electronic circuitry is configured to indicate a user when the lock is openable and when access is denied.

19. The electromechanical lock of claim 3, wherein the electronic circuitry is configured to indicate a user when the lock is openable and when access is denied.

20. The electromechanical lock of claim 4, wherein the electronic circuitry is configured to indicate a user when the lock is openable and when access is denied.

\* \* \* \* \*